United States Patent [19]

Smith et al.

[11] Patent Number: 4,792,765

[45] Date of Patent: Dec. 20, 1988

[54] LASER RESONATOR WITH HIGH ASPECT RATIO GAIN REGION AND AZIMUTHALLY SYMMETRIC FRESNEL NUMBER

[75] Inventors: David C. Smith, Glastonbury, Conn.; Kurt E. Oughstun, Madison, Wis.

[73] Assignee: United Technologies Corporation, Hartford, Conn.

[21] Appl. No.: 909,370

[22] Filed: Sep. 19, 1986

[51] Int. Cl.⁴ .................. H01S 3/05; H01S 3/086; H01S 3/083

[52] U.S. Cl. .................. 330/4.3; 372/95; 350/620

[58] Field of Search .............. 330/4.3; 372/19, 95, 372/96, 100, 102, 106; 350/619, 620

[56] References Cited

U.S. PATENT DOCUMENTS

| | | | |
|---|---|---|---|
| 4,126,381 | 11/1978 | Chodzko et al. | 350/620 |
| 4,170,405 | 10/1979 | Sziklas | 372/95 |
| 4,239,341 | 12/1980 | Ceasar et al. | 350/620 |
| 4,361,889 | 11/1982 | Salenson | 372/95 |
| 4,494,235 | 1/1985 | Guch et al. | 372/95 |
| 4,669,088 | 5/1987 | Waite | 372/95 |

OTHER PUBLICATIONS

Paxton, A. H.; "Propagation of ... Azimuthal ... Feature"; J. Opt. Soc. Am., vol. 1, #3, 3/84, pp. 319–321.
Paxton, A. H.; "Unstable Resonators ... Fresnel Numbers"; Opt. Lett., vol. 11, #2; 2/86; pp. 76–78.
Anan'ev et al, "Properties of Unstable Resonators ...", Sov. J. Quant. Elect., vol. 9, #9, 9/79, pp. 1105–1110.
Guha et al, "Performance of an Annular Resonator ...", Appl. Opt., vol. 20, #23, 12/1/81, pp. 4135–4140.
Chodzko et al, "Annular (HSURIA) Resonators ...", Appl. Opt., vol. 19, #5, 3/1/80, pp. 778–789.

Primary Examiner—Nelson Moskowitz
Attorney, Agent, or Firm—Eric W. Petraske

[57] ABSTRACT

An unstable optical resonator having a gain region that has an elliptic or other non-circular cross section still has the benefits of a total collimated cavity Fresnel number that is azimuthally symmetric by the combination of several cavity regions of azimuthally non-uniform Fresnel number of appropriate size.

4 Claims, 2 Drawing Sheets

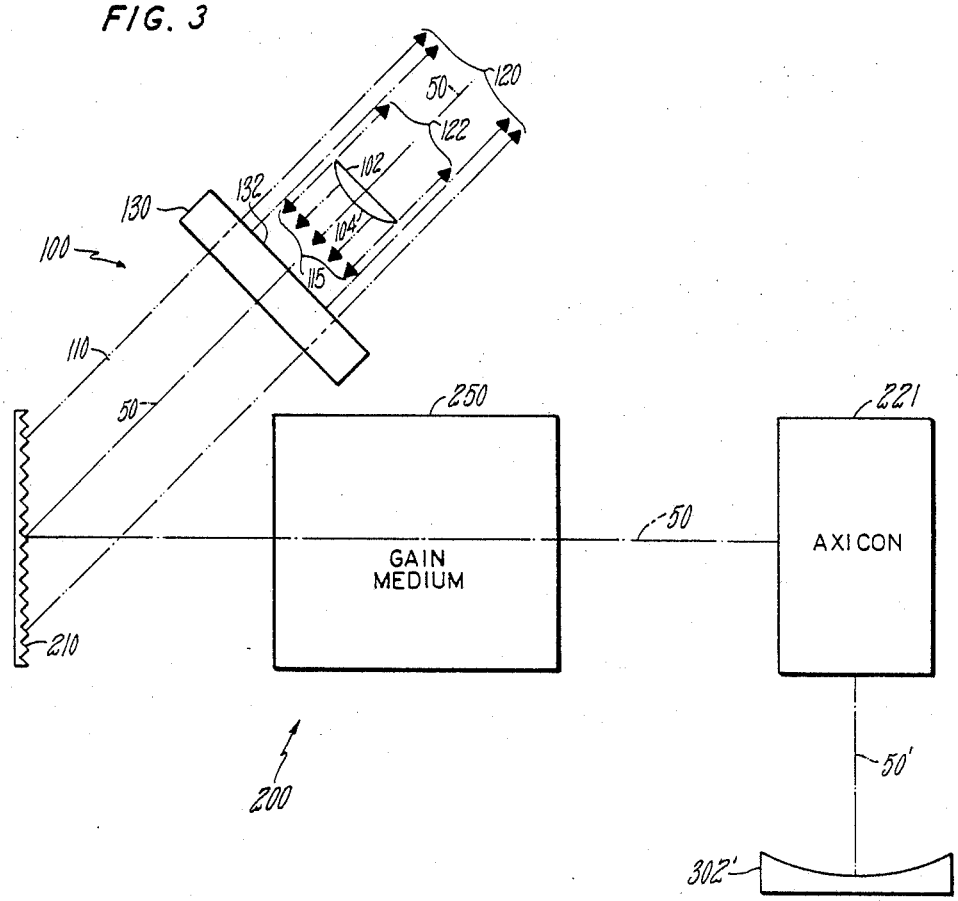

LASER RESONATOR WITH HIGH ASPECT RATIO GAIN REGION AND AZIMUTHALLY SYMMETRIC FRESNEL NUMBER

TECHNICAL FIELD

The field of the invention is that of unstable optical resonators, in particular those in which the gain region has an aspect ratio significantly different from one.

BACKGROUND ART

There is a well-known class of lasers, such as $CO_2$ electric discharge and chemical lasers, for which the gain region generally has a long dimension along the beam and a rectangular or elliptical cross section with a high aspect ratio. Such a region is, of course, not azimuthally isotropic.

It is well known in the field that for optimum transverse mode control in an unstable laser device, it is required that the feedback field (or the electric field in the vicinity of the feedback mirror) possess a half-integral equivalent Fresnel number that is azimuthally isotropic over the feedback mirror.

The problem addressed by the present invention is the reconciliation of these two conflicting requirements.

DISCLOSURE OF INVENTION

The invention relates to an unstable optical resonator (either oscillator or power amplifier) having an azimuthally non-isotropic electric field in the gain region, but also having a total collimated cavity Fresnel number at the plane of the feedback aperture that is azimuthally isotropic.

A feature of the invention is the use of a cavity having a beam with an elliptic cross section in a gain region and means for changing the shape of the beam cross section in another region.

Another feature of the invention is the combination of contributions from different regions of the optical cavity, each having a non-isotropic Fresnel number, that combine to form a total Fresnel number that is substantially isotropic.

BRIEF DESCRIPTION OF DRAWINGS

FIG. 3 illustrates a plan view of an alternate embodiment of the invention.

Other features and advantages will be apparent from the specification and claims and from the accompanying drawings which illustrate an embodiment of the invention.

BEST MODE OF CARRYING OUT THE INVENTION

Figure 1:
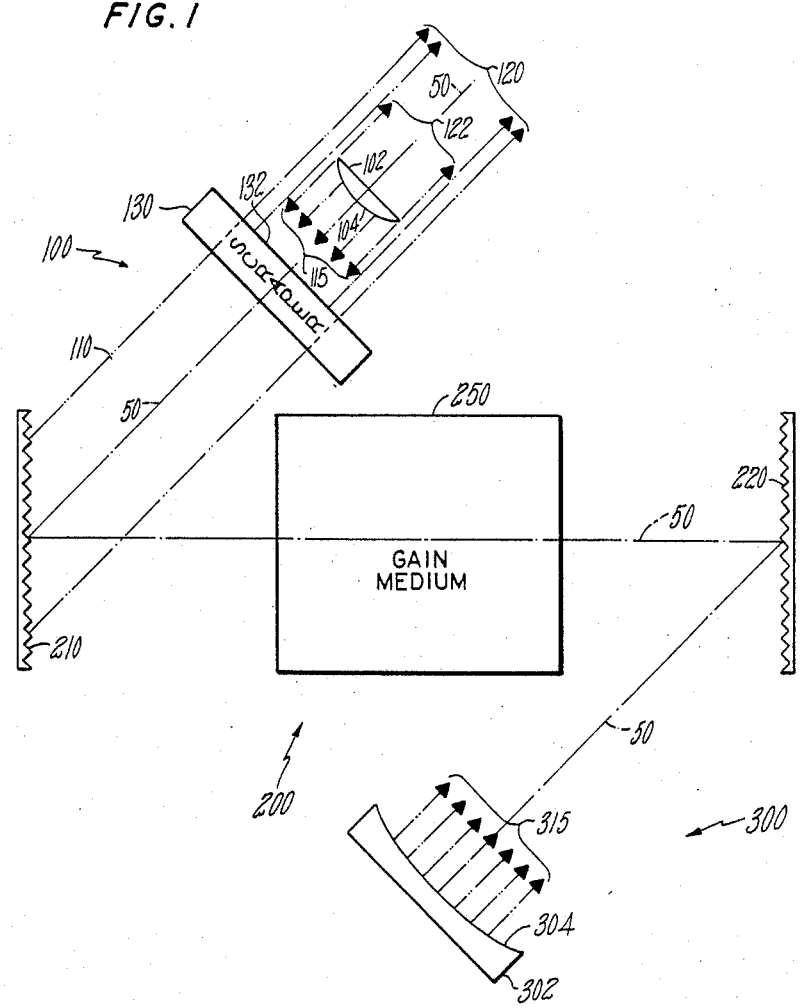
FIG. 1 illustrates a plan view of an optical resonator constructed according to the invention.

FIG. 1 illustrates a plan view of an embodiment of the invention that is an unstable optical resonator having two spherical surface mirrors. Convex mirror 102 having spherical feedback surface 104 and an elliptical cross section, is located in a region that is referred to as the feedback region and is indicated generally by the numeral 100. The back mirror of the resonator is indicated by the numeral 302, with spherical back surface 304 and cross-section of sufficient size so as to contain the cross-section of the field at that plane, and is located in a region indicated generally by the numeral 300 in the back region of the resonator. The intermediate region, indicated by the numeral 200, contains the gain medium which is represented schematically by a box indicated by the numeral 250. Box 250 also represents means for producing an inversion in the gain medium, optical windows and the like, all well known to those skilled in the art. An optical axis, indicated by a phantom line labeled with the numeral 50, passes through these three regions and indicates the direction of travel of the optical wavefront as it passes back and forth through the resonator. In many lasers, such as electric-discharge $CO_2$ lasers or chemical lasers, it is required for efficient transfer of energy into the gain medium that the gain medium be narrow perpendicular to the plane of the paper in FIG. 1. In that case, having a gain medium of some desired volume requires that the two dimensions in the plane of the paper be relatively long. The cross section seen by the beam as it passes through the gain medium is then a rectangle or an ellipse having an in-plane dimension substantially greater than the dimension perpendicular to the plane. The most useful beam shape in such a gain medium is an ellipse having a high aspect ratio (rectangular beams have poor focusing properties).

Near feedback mirror 102, there is a geometric region containing radiation indicated by the numeral 115 that is referred to as the feedback pass radiation and defines radiation reflected from mirror 102 along axis 50 which will be eventually reflected back from mirror 302. This pass of radiation or pass of the wavefront is referred to in the trade as the feedback pass. Similarly, radiation reflected from surface 304 of mirror 302 is contained in a substantially collimated volume having an elliptical cross section indicated by the numeral 315. This radiation (referred to in the field as the outcoupling pass) is directed back towards feedback mirror 102. Some of the radiation 315 will be intercepted by mirror 102 in another feedback pass. The remainder of the radiation will exit as shown in an output beam indicated by a bracket labeled with the numeral 120. This output beam will have the form of an "elliptical" shell containing an obscured central region 122 that is blocked by the output feedback mirror 102. The aperture through which the radiation exits is referred to as the feedback aperture.

The radiation may exit directly past the feedback mirror 102 or, alternatively, it may be deflected by a scraper mirror indicated schmatically by a box labeled with the numeral 130. This scraper mirror will have an aperture 132 sized to permit radiation to pass through the aperture, strike feedback surface 104 and be fed back towards mirror 302. The remainder of the radiation will be deflected upwards by the scraper mirror perpendicular to the plane of the paper. These two methods of extracting the beam are regarded as being substantially equivalent for purposes of this invention. In each case, the outcoupling plane is the plane containing the outcoupling aperture, 122 or 132 as the case may be.

As is known in the art, the best mode control and focusability in the far field is provided when the equivalent Fresnel number at the output aperture is azimuthally isotropic. It is also known that the equivalent Fresnel number of an elliptic aperture region with aspect ratio K is given by:

$$N_{eq}(\theta) = N_{eq\,x}(\cos^2\theta + K^2\sin^2\theta)$$

where $N_{eq\ x}$ is the equivalent Fresnel number of the region along the X axis (in the plane of the paper) and $\theta$ is the angle with respect to that axis.

In the embodiment shown, the gain medium is located in a region indicated by the numeral 200 that is bounded by two blazed diffraction gratings 210 and 220. For convenience of illustration, these gratings are shown with a blaze angle of 45 degrees, reflecting beam 50 along a 45 degree line. Those skilled in the art will readily be able to design optical cavities having different angles of deflection to meet other engineering requirements imposed on the system. Each diffraction grating will "lift the footprint"; or reflect the radiation incident on it with an outgoing cross section that is effectively determined by the cross section of the incoming beam that is intercepted by the plane of the defraction grating.

Figure 2A:
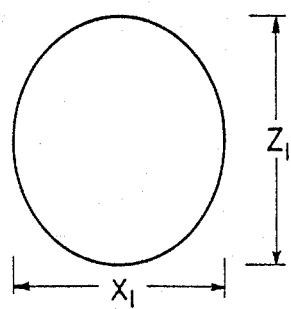
FIGS. 2a and 2b illustrate cross sections of an optical beam passing through the resonator.
Figure 2B:
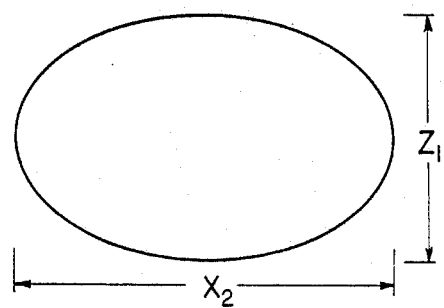

In general, the radiation in region 100 will have an elliptical cross section, with mirror 102 and aperture 132 also having elliptical cross sections. The radiation passing through region 200 will also be elliptical but with a different eccentricity determined by the angle of the grating. If the plane of the paper is the X,Y plane and the Z axis is perpendicular to the plane of the paper, then the incoming beam will have a dimension in the Z axis ($Z_1$), as shown in FIG. 2a, and a dimension in the X axis, say $X_1$. The beam reflected from grating 210 and passing through region 200 will have the same dimension along the Z axis because the planar grating 210 will not affect the Z dimension. The dimension in the XY plane will be changed according to the sine of the angle between the incoming beam line 50 and the plane of grating 210. An example of the beam passing through region 200 is indicated in FIG. 2b. This beam in the feedback pass will be increasing in cross section as it travels through the cavity, of course. A similar transformation also related by the same angle will take place at grating 220. The eccentricity of the beam will again be altered to produce a beam of a third cross section in region 300. This feedback pass beam will be reflected off surface 304 of mirror 302 as a collimated output beam 315 (or radiation in the outcoupling pass) that is reflected back towards feedback mirror 102.

Those skilled in the art will readily be able to calculate the total collimated cavity Fresnel number ($N_c$) at the plane of the output aperture, which is given by:

$$\frac{1}{N_c} = \frac{1}{N_c'}\bigg|_{100} + \frac{1}{N_c'}\bigg|_{200} + \frac{1}{N_c'}\bigg|_{300} +$$

$$\frac{1}{N_c''}\bigg|_{100} + \frac{1}{N_c''}\bigg|_{200} + \frac{1}{N_c''}\bigg|_{300}$$

where the single prime on the collimated Fresnel numbers denotes the feedback pass Fresnel number (or the Fresnel number calculated for the volume containing the feedback pass radiation) and the double prime superscript denotes the outcoupling pass Fresnel number (calculated similarly for the volume of the outcoupling pass) in the relevant cavity section. The Fresnel zones for each region of the cavity will be a series of closed ellipses, each of which is azimuthally non-isotropic.

Proper adjustment of the dimensions of the optical cavity, including the magnitude of the apertures and the length of each section of the cavity will enable those skilled in the art to produce a total cavity collimated Fresnel number that is substantially isotropic by combining non-isotropic Fresnel numbers of regions where the beam has opposite eccentricity. It is not necessary, of course, that the collimated cavity Fresnel number be perfectly isotropic, and the usual engineering tradeoffs will have to be made to balance smoothness of total Fresnel number with other considerations.

In the particular embodiment of FIG. 1, the two gratings 210 and 220 are matched in angle and in the direction of the grating lines. This configuration has the advantageous feature that it will define a single polarization for the radiation in the cavity.

Referring now to FIG. 3, there is shown an alternate embodiment of the invention in which sections 1 and 2 are as before, except that blaze grating 220 has been replaced by a box indicated by the numeral 221. This box may be an axicon, a non-spherical mirror, or any other reflective device that will change the cross section of the beam. Box 221 also may include a beam rotating device, such as a corner cube, that will rotate the orientation of the beam by 90 degrees. A similar mirror, 302 prime, is placed to intercept radiation emerging from box 221 and to reflect it back. Those skilled in the art will readily be able to construct this and other alternate embodiments of the invention. This alternate embodiment, having only one blazed diffraction grating will not preserve the polarization within the cavity.

As discussed above, output mirror 102 will have a spherical surface but will be generally elliptical in cross section. Back mirror 302 will also have a spherical surface, but the shape is not important so long as it is large enough to reflect back the radiation.

In a particular embodiment, the beam in sections 100 and 300 has a circular cross section and the matched blazed grating pair 210 and 220 convert the circular cross section to an ellipse having eccentricity given by 1/sin 0 where 0 is the angle between beam line 50 and the plane of grating 210. A cavity of this sort will not have an azimuthally isotropic Fresnel number at the output aperture, even though the beam itself is azimuthally symmetric, unless the optical sections of the optical cavity are balanced as described above or unless some equivalent metood such as beam rotation, is used to render the Fresnel number of the output region substantially isotropic.

As a numerical example, a DF chemical laser having a one inch dimension in the flow direction, an eight inch dimension in the transverse dimention and four meters long, of the type illustrated in FIG. 1 has the following parameters; angle between region 100 and 200 45 degrees; angle between regions 200 and 300 45 degrees; and the following other parameters:

| Region | Aspect Ratio | Approximate Length of Region |
|--------|--------------|------------------------------|
| 100    | ⅛            | ½ meter                      |
| 200    | 8            | 4 meters                     |
| 300    | ⅛            | ½ meter                      |

It should be understood that the invention is not limited to the particular embodiments shown and described herein, but that various changes and modifications may be made without departing from the spirit and scope of this novel concept as defined by the following claims.

We claim:

1. An unstable optical resonator for amplifying optical radiation having a diverging wavefront comprising:
   a feedback region terminating at a feedback mirror having a feedback mirror surface for reflecting optical radiation in a feedback pass and containing an outcoupling aperture located in an outcoupling plane;
   a gain region containing means for producing an inverted state in a gain medium, said gain region having a non-circular cross section and said diverging wavefront having an azimuthally anisotropic electric field in said gain region; and
   a back region terminating in a back mirror having a back mirror surface oriented to reflect optical radiation in an output pass back toward said feedback region; in which
   each of said regions has a feedback pass Fresnel number and an output pass Fresnel number; characterized in that
   said resonator further includes at least one means for changing the cross section of an optical wavefront incident thereon; and
   said regions have dimensions related to one another and to the wavelength of said optical radiation such that a total collimated cavity Fresnel number at said outcoupling aperture is substantially azimuthally symmetric.

2. A reasonator according to claim 1, further characterized in that said means for changing the cross section comprises a pair of blazed-plane diffraction gratings, each having a set of grating lines and being oriented such that said sets of grating lines are parallel one another, bounding said gain region, whereby said optical radiation is maintained in a polarization state determined by said blazed-plane diffraction gratings.

3. A reasonator according to claim 1, further characterized in that said means for changing the cross section of an optical wavefront includes at least one reflective optical element having a non-spherical surface.

4. A resonator according to claim 1, further characterized in that said means for changing the cross section of an optical wavefront includes at least one means for rotating said optical radiation having a diverging wavefront about an axis parallel to the direction of travel of said wavefront.

* * * * *